United States Patent

Takeda

[15] 3,699,670

[45] Oct. 24, 1972

[54] REPRODUCING DEVICE

[72] Inventor: Yukio Takeda, Neyagawa, Japan

[73] Assignee: Matsushita Electric Industrial Co., Ltd., Osaka, Japan

[22] Filed: Sept. 28, 1970

[21] Appl. No.: 76,161

[30] Foreign Application Priority Data

| | | |
|---|---|---|
| Oct. 2, 1969 | Japan | 44/79395 |
| Oct. 8, 1969 | Japan | 44/80945 |
| Oct. 11, 1969 | Japan | 44/81347 |
| Oct. 15, 1969 | Japan | 44/82834 |
| Oct. 11, 1969 | Japan | 44/81348 |

[52] U.S. Cl. .............35/35 C, 179/100.2 R, 274/1 D

[51] Int. Cl......G09b 5/04, G11b 15/18, G11b 19/20

[58] Field of Search ........35/8 A, 35 C; 179/100.2 R; 274/1 R, 1 D

[56] References Cited

UNITED STATES PATENTS

| | | | |
|---|---|---|---|
| 3,059,347 | 10/1962 | Warner et al. | 35/35 C |
| 2,491,243 | 12/1949 | Anderson | 274/1 D X |
| 2,787,669 | 4/1957 | Flan et al. | 35/8 A X |
| 3,245,156 | 4/1966 | De Bloois et al | 35/8 A |

*Primary Examiner*—Wm. H. Grieb
*Attorney*—Stevens, Davis, Miller & Mosher

[57] ABSTRACT

In a record player, magnetic reproducing apparatus, magnetic recording and reproducing apparatus, etc. used for reproducing a sound recorded on a disc record or tape record; the reproducing device comprising a stop motion for temporarily stopping automatically or manually the movement of said recording medium in relation to a converter element, a means interlocked with said stop motion for switching the input of an amplifier between a converter element such as a pick-up cartridge or a magnetic head and a microphone, and a releasing means for de-energizing said stop motion, a teacher's model speech or pronunciation being reproduced by the relative movement of said recording medium and converter element in a reproducing operation, said reproducing operation then being temporarily stopped, which connects a microphone with the amplifier and enables a learner to hear his own speech or pronunciation through headphone, earphone or a speaker, the temporary stoppage of reproduction being released on completion of said hearing of the learner's own voice, thereby to reproduce a teacher's model again.

11 Claims, 9 Drawing Figures

Y. TAKEDA
INVENTOR

BY Stevens, Davis, Miller & Mosher
ATTORNEY

REPRODUCING DEVICE

The present invention relates to a reproducing device suitable for the purpose of learning which requires practice in pronunciation, such as language study.

In conducting a study which requires speaking and pronouncing practice such as language study it is very effective to use a disc recording or a tape recording as teaching materials. Especially when studying a foreign language, such a device is very useful as it helps a learner to pronounce as correctly as a native speaker, and also allows him to follow the native speaker's speech as many times as he likes when and as desired.

One of the simplest learning methods employing these teaching materials is for a learner to hear passively the recorded teacher's model speech or pronunciation as it is reproduced on a disc record player, magnetic recording and reproducing apparatus or magnetic reproducing apparatus. If there are pauses provided in the recorded teacher's voices, the learner can take advantage of them to imitate the pronunciation of the teacher. The conventional device used for this purpose is simple in construction and easy to operate. But its main purpose is to learn by hearing, and even if the learner wants to practice his own speaking or pronunciation, such a device does not provide a satisfactory means, since the recorded voice he hears through a reproducing operation is a "bone-transmitted sound," i.e. a sound which reaches his ears through his own body, rather than an "air-transmitted sound." As a result, it is impossible for him to hear his own voice objectively and therefore it is difficult for him to pinpoint the defects of his pronunciation.

A more advanced method uses a magnetic recording and reproducing apparatus with two recording tracks. A learner hears the sound of a teacher's model recording on one of the tracks and records on the other track his imitation of or answer to the teacher's model or question. Then the sounds recorded on both tracks are reproduced by reeling back the tape or other recording media, thereby to compare the learner pronunciation with that of the teacher. This method has an advantage that the learner can hear his speech quite objectively so as to compare it with the sample speech recorded, but the trouble with a device of this kind is the complexity of its construction as well as of its operation which requires a number of processes including recording, reeling back of a recording medium and then reproducing.

Accordingly, it is an object of the present invention to provide a reproducing device which is very suitable for the learning of a language or other subject matter requiring practice in pronunciation.

Another object of the present invention is to provide a low-cost reproducing device which is easy to operate for learning a language or other subjects which requires pronunciation practice.

In addition to a converter element for converting the recorded information into an electric signal, an amplifier for amplifying said electric signal, a hearing means for hearing said electric signal as a voice, a voice receiver and a driving system for driving a recording medium; the reproducing device of the present invention is equipped with a stop motion for temporarily stopping the recording medium during a reproducing operation and a switching means interlocked with said stop motion for switching the input terminal of the amplifier between the converter element and voice receiver during reproduction, whereby the amplifier is used for the dual purpose of amplifying a signal from the converter element as well as the one from the voice receiver. Also, while the recording medium is temporarily stopped by the stop notion, the output signal from the voice receiver can be amplified by said amplifier and heard by the learner through the hearing means. On the other hand, when the recording medium is restarted by de-energizing the stop motion, the signal from the converter element can be amplified by the amplifier to be heard by the hearing means.

According to the present invention, an amplifier for reproduction is used as a microphone amplifier during a period in which the recording medium is stopped after a hearing lesson. In this way, the imitation of the recorded teacher's sound or the learner's own speech is amplified and strongly fed back to the ears of the learner through a headphone or earphone. This amplified air-transmitted sound is so strong that it outvoices the "bone-transmitted" sound which reaches his ears through his body. The learner, therefore, can hear the result of his pronunciation objectively and thus can effectively correct his defects by comparing his pronunciation with the teacher's example. When wanting to hear the recorded example again by driving the recording medium after finishing a hearing lesson, said amplifier is switched from the microphone to the reproducing circuit for reproducing the recorded example of the teacher's pronunciation. Because of this double role played by the single amplifier, this reproducing device is very inexpensive. Further, the switching operation between the hearing of the teacher's voice and the learner's pronouncing practice can be easily performed either manually or automatically as desired. Also, since the recording medium is stopped during a pronounciation practice, the density of lesson material contained in the recording medium is very high, which makes it possible to reduce the cost of the recording medium itself.

As described above, the present invention provides a very effective and low-cost means for language study accompanied by pronunciation practice.

The above and other objects, features and advantages will be made apparent by the detailed description taken in conjunction with the accompanying drawings, in which.

Figure 1:
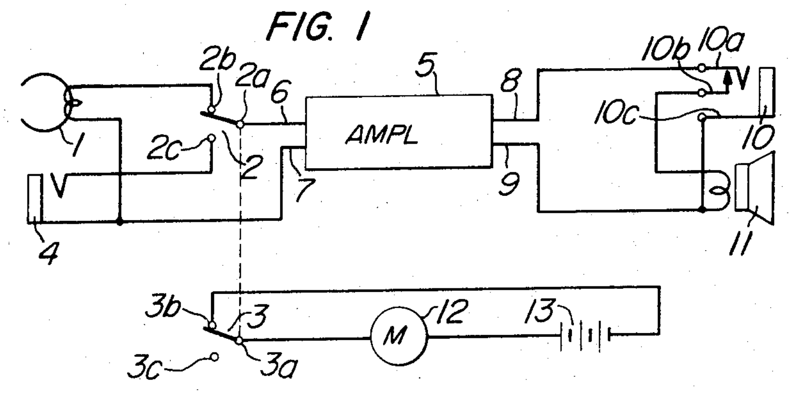
FIGS. 1, 2 and 3 are electric circuit diagrams showing embodiments of the device according to the present invention.

Referring now to FIG. 1, a signal generated at the magnetic recording head 1 is applied through the contacts **2*b* and 2*a* of the switch 2 to the input terminals 6 and 7 of amplifier 5, and the amplified signal appears at the output terminals 8 and 9. This signal energizes the speaker 11 after passing through the terminals 10***a* and 10*b* of the earphone jack 10. At this time, by inserting a plug connected with an earphone into the earphone jack 10, the contacts 10*a* and 10*b* are disconnected with each other thereby to de-energize the speaker 11.

On the other hand, the contacts 3*a* and 3*b* of the switch 3 which are interlocked with the switch 2 are in contact with each other and so the driving motor 12 is driven by the power supply 13. Assume that the learner, on completion of hearing reproduced teaching materials, closes the movable contacts 2*a* and 3*a* respectively of the switches 2 and 3 to the sides of contacts 2*c* and 3*c*. The signal from the head 1 is cut off and instead the signal from the microphone jack 4 appears at the output terminals 8 and 9 of the amplifier 5, thereby to energize the speaker or the earphone 11. At the same time, a current to the motor 12 is cut off by the switch 3, stopping the motor 12 and eventually the tape. While the tape is stopped, the learner pronounces himself and after that restores the switches 2 and 3 to their original positions, whereby the microphone is de-energized and the signal from the head 1 is applied to the amplifier 5, thereby starting the motor 12. Thus, the learner can hear the next lesson contained in the recording medium.

Figure 2:
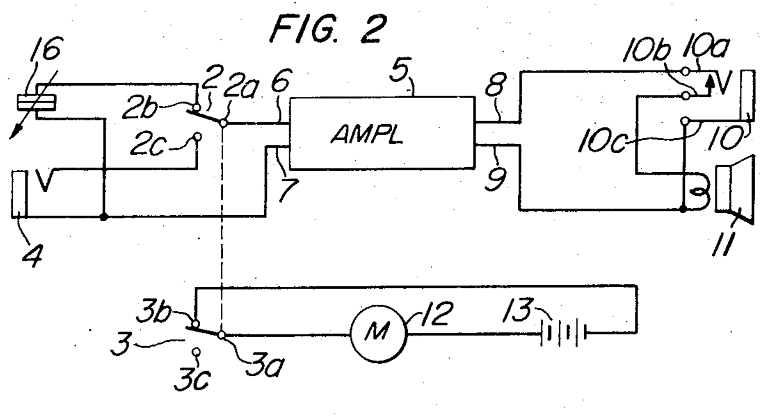
Figure 3:
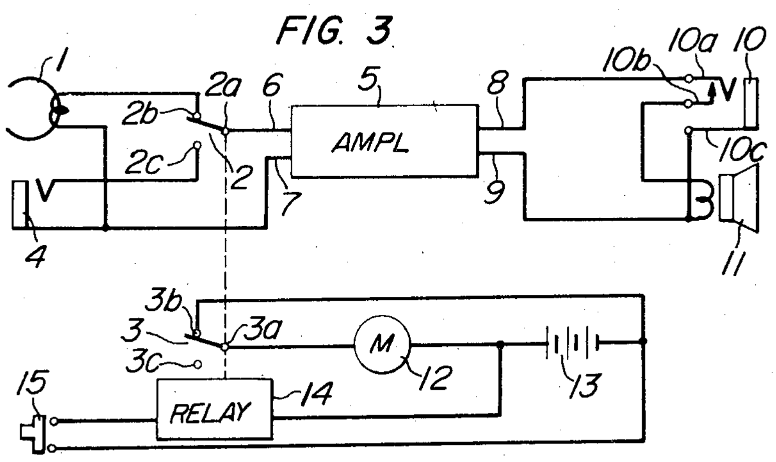
Figure 4:
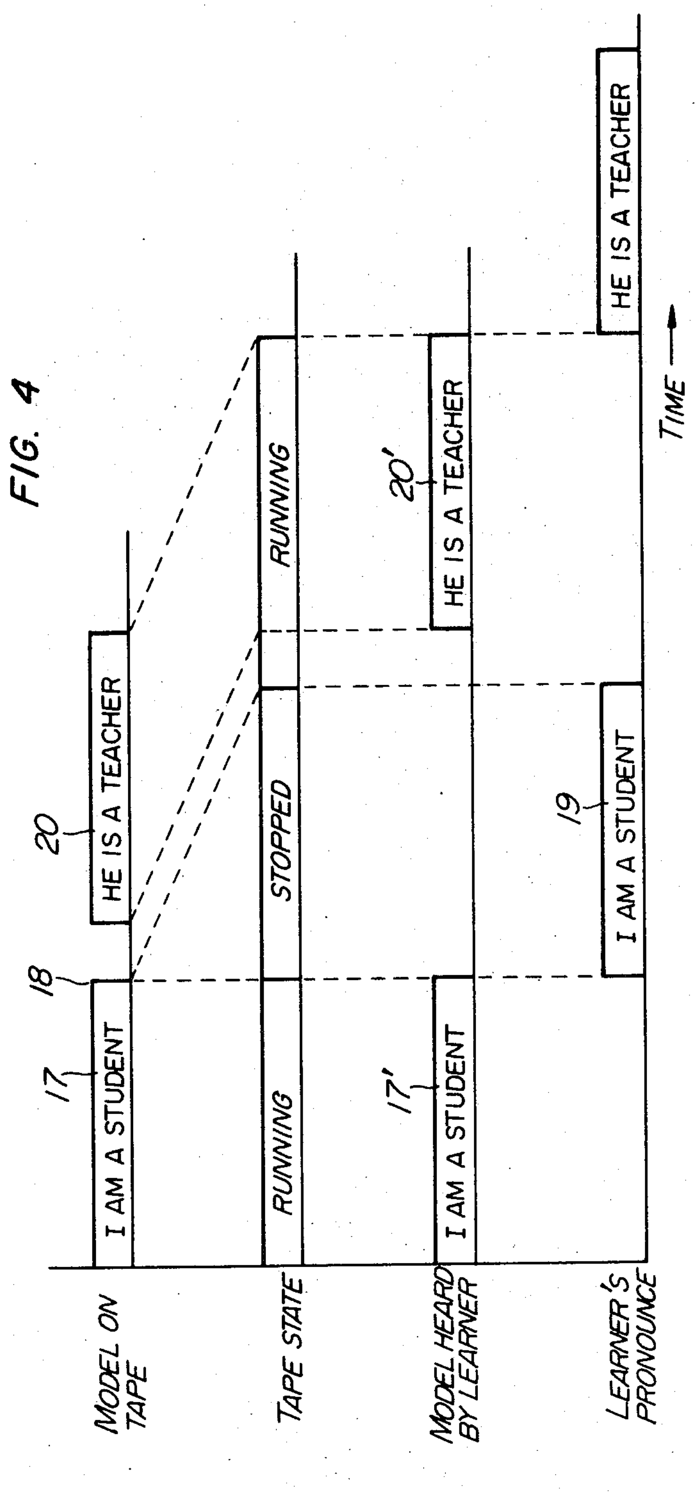
FIG. 4 is a diagram showing the manner in which the above-mentioned embodiments are operated.

Other embodiments of the invention are shown in FIGS. 2 and 3, in which the components appearing also in FIG. 1 are provided with the same numerals. FIG. 2 shows an application of the present invention to a record player in place of a magnetic recording and reproducing machine or magnetic reproducing machine. The numeral 16 shows a pickup which converts the teacher's model in a sound form into electric signals. The embodiment shown in FIG. 3 is so constructed that the switches 2 and 3 are operated by the push button 15 indirectly through the relay 14. The manner in which study is made by the use of the above-mentioned devices is shown in FIG. 4. The teacher's model 17 is reproduced from the magnetic tape, and when the tape end 18 is reached, the reproduction from the tape is stopped by operating the switches 2 and 3. While the tape is stopped, the learner conducts a speaking or pronouncing practice imitating or considering the reproduced teacher's model as shown by the numeral 19. After that the switches 2 and 3 are returned to the original positions to hear the teacher's model 20. The above processes are repeated.

Still another embodiment of the present invention will be explained below with reference to FIG. 5. A signal generated at the reproducing head 21 is applied through the switch 22 to the amplifier 23 where it is amplified, and the resulting output is applied through the amplifier 25 to the earphone jack 26 after being adjusted by the volume control 24. When connected with the earphone jack 26, an earphone is energized, and when not connected with it, the speaker 27 is energized.

The switch 22 is included to switch the input of the amplifier 23 between the reproducing head 21 and the microphone 28 and is controlled by a relay. The output of the amplifier 23 is divided and one of the divisions is applied through the band-pass filter 29 to the diode 30 where it is rectified. Then this divided output appears across the capacitor 31 and the resistor 32 as a d-c potential which is applied between the base and the emitter of transistor 33. The power supply 34 and the relay 35 which are connected in series with each other are inserted between the collector and the emitter of the transistor 33. As a consequence, the transistor 33 is made to conduct when said d-c potential is applied between the base and the emitter, thereby causing a collector current which energizes the relay 35.

Between the collector and the emitter of transistor 33 are connected in series the switch 36 and the switch 37 which is controlled by the relay 35. The power supply 34 is connected with a series circuit consisting of the switch 38 which is controlled by the relay 35 and of the tape driving motor 39.

Figure 5:
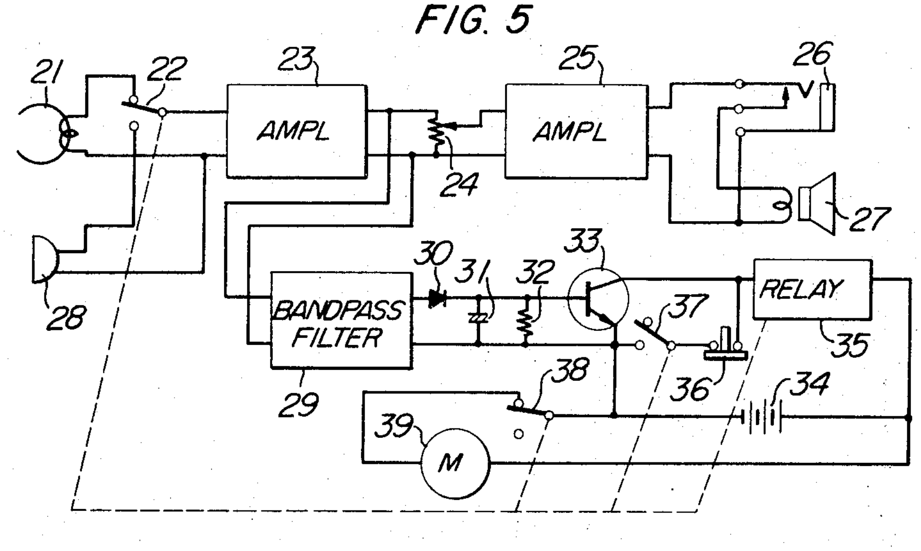
FIGS. 5 and 6 are a circuit diagram showing another embodiment of the present invention.

In this embodiment of the above construction, the transistor 33 is not conducting and also the relay 35 does not operate under normal conditions, when the switches 22, 37 and 38 controlled by the relay 35 are connected with one another as shown in FIG. 5. As a result, a signal generated at the reproducing head 21 passes through the amplifier 23, volume control 24 and amplifier 25 to energize the earphone or speaker 27, thereby reproducing the sounds recorded on tape. The center frequency of the band-pass filter 29 to which a division signal from the amplifier 23 is applied is set at, say, 50 or 60 $H_Z$ or lower, a level considerably different from the ordinary voice frequency. Since a signal of the same frequency as said center frequency is recorded, for example, at the end of a lesson on the tape, a signal of the ordinary voice or music which may be generated at the reproducing head 21 at the time of language practice does not come out as the output of the filter 29. Even if the frequency of the voice or music happens to agree with the center frequency of the filter 29, that signal of voice or music most often dies out before the potential of the capacitor 31 is sufficiently elevated. Therefore, the transistor 33 is not triggered. If this frequency separation is to be further assured, it is recommended that the signal of the ordinary voice or music be recorded on the tape through a filter with characteristics reverse to those of the band-pass filter 29.

After the learner finishes a lesson according to the recorded teacher's model, a signal for temporary stoppage, namely, a signal with the same frequency as that of the center frequency of the band-pass filter 29 is recorded on the tape. This generates a sufficient output of the filter 29 when that signal is reproduced by the reproducing head 21. This output is rectified by the diode 30 and as a result a d-c potential is generated across the capacitor 31. This voltage is then applied between the base and the emitter of transistor 33, thereby energizing the transistor 33, and the collector current is increased, energizing the relay 35. The energization of the relay 35 causes the switches 22, 37 and 38 to be changed over. The changeover of the switch 22 causes the microphone 28 to be connected with the amplifier 23, which enables the sounds from the microphone 28 to be heard through the earphone or the speaker and therefore enables the learner to practice his pronunciation or speech by using the microphone 28. The change-over of the switch 37, on the other hand, causes the relay 35 to be self-maintained. Also, the changeover of the switch 38 results in the power supply to the motor 39 being cut off, thereby stopping the tape feed.

In this way, when the learner has completed hearing the recorded lesson, the tape is automatically stopped and at the same time the circuit of the microphone 28 is triggered. Therefore, the learner can practice his pronunciation or speech through the speaker 27 either by imitating or considering the recorded model.

Upon completion of his pronunciation or speaking practice, the learner depresses the switch 36 to open it and then the self-maintenance of the relay 35 is interrupted, whereby the switches 22, 37 and 38 are restored to the original state as shown in the drawing. Consequently, not only the circuit of the reproducing head 21 is energized, but the motor 39 is started, thereby presenting the next lesson.

Another embodiment of the present invention is explained below with reference to FIG. 6, in which the numeral 40 shows a reproducing head, the numeral 41 an amplifier for amplifying the output of the reproducing head 40, the numeral 42 an amplifier for amplifying the output of the amplifier 41 through a switch, the numeral 43 an earphone jack connected to the output end of the amplifier 42, and the numeral 44 a speaker which is disconnected from the amplifier 42 when an earphone is connected with the earphone jack 43. The numeral 45 shows a bandpass amplifier connected with the output side of the amplifier 41, the numeral 46 a transistor whose base is connected with one of the outputs of the band-pass amplifier 45 through the diode 47 and whose emitter is connected with the other output of the bandpass amplifier 45, the numerals 48 and 49 a capacitor and a resistor respectively inserted between the base and the emitter of the transistor 46. The numeral 50 shows a power supply, and the numeral 51 shows the first relay inserted between the collector of transistor 46 and the power supply 50 and consists of the switches 52, 53 and 54. The numeral 55 shows a motor for driving the tape, the numeral 56 a capacitor inserted between the collector and the emitter of transistor 46, the numeral 57 a microphone jack, the numeral 58 an amplifier for amplifying the output from the microphone jack 57, the numeral 59 a transistor whose base is connected to one of the outputs of the amplifier 58 through the diode 60 and whose emitter is connected with the other thereof, the numerals 61 and 62 a capacitor and a resistor respectively inserted between the base and the emitter of transistor 62, the numeral 63 the second relay inserted between the collector of transistor 59 and the power supply 50 and which consists of the three switches 64, 65 and 66. The switch 52 of the first relay 51 is inserted between the amplifier 41 and the switch 64 of the second relay 63 in such a manner as to be switched between the output of the reproducing head 40 and that of the microphone jack 57. The switch 64 of the second relay 63 is provided so that the output from the reproducing head 40 is applied to the amplifier 42 only when the switch 52 of the first relay 51 is so switched over that the output from the reproducing head 40 is transmitted to the switch 64 and the switch 64 is connected to the side of the reproducing head 40. On the other hand, the switch 53 of the first relay 51 in series with the switch 65 of the second relay 63 is connected in series with the relay 51 to self-maintain it, while the switch 54 of the relay 51 in series with the switch 66 of the second relay 63 is inserted in the power circuit of the motor 55.

Now, the operation of this embodiment will be described below. Usually, the switches 52 to 54 and 64 to 66 of the relays 51 and 63 respectively are positioned as shown in the drawing. Under this condition, a reproducing medium or tape on which a stop signal is recorded at the end of each lesson is mounted on the apparatus and a power switch (not shown in the drawing) provided in the power circuit of the motor 55 is closed. Then, the motor 55 is started and the signals on the reproducing tape are passed through the reproducing head 40, amplifier 41, switches 52 and 64 and amplifier 42 to be picked up as sounds by the earphone or speaker 44.

At this time, the voice signal is also applied to the band-pass amplifier 45. But since the band-pass amplifier 45 blocks the voice signal, the transistor 46 does not conduct and therefore the relay 51 remains inoperative. As a consequence, the above-mentioned reproducing operation is continued. When a signal for temporary stoppage with a frequency different from that of the voice recorded on the reproducing tape is picked up by the reproducing head and passes through the band-pass amplifier 45, the electric potential of the capacitor 48 is raised and the resulting voltage is applied to the transistor 46. Then this transistor begins to conduct and its collector current is increased, thereby energizing the first relay 51. As a result, the switches 52, 53 and 54 are changed over, opening the circuit of the reproducing head 40 and connecting the microphone circuit with the amplifier 42. On the other hand, the first relay is self-maintained by the switch 53. The power circuit of the motor 55 is opened by the switch 54, thereby stopping the feed of the reproducing tape. Consequently, the learner's voice uttered through the microphone in a pronouncing or speech practice imitating the teacher' s model on the reproducing tape can reach the learner's ears as an objective sound through the earphone or speaker 44. The voice signal from the microphone is applied to the transistor 59 causing it to conduct, whereby the switches 64, 65 and 66 are changed over. Despite the change-over of the switch 64, the signal from the microphone is maintained applied to the earphone or speaker 44. The changeover of the switch 65, on the other hand, releases the first relay 51 from self-maintenance thereof, but the relay 51 continues operation thereof for some time due to a charging current of the capacitor 56. Also, the change-over action of the switch 66 causes the power circuit of the motor 55 to remain opened further, and therefore the stoppage of the motor 55 is maintained even after the relay 51 becomes inoperative on completion of the charging of said capacitor 56. For this reason, even if the first relay 51 becomes inoperative, the motor 55 is stopped and the voice from the microphone can be heard through the speaker or earphone 44. Upon completion of a pronounciation practice against the microphone, the transistor 59 is cut off and as a result the second relay 63 becomes inoperative, the switches 64, 65 and 66 being restored to their original state as shown in the drawing. Hence the circuit of the reproducing head 40 is connected with the amplifier 42 and at the same time the motor 55 is started, thereby causing the reproducing tape to run. Thus the next lesson can be heard through the earphone or speaker 44. The above-described processes of operations are repeated to practice a language study imitating or comparing the teacher's model.

Figure 6:
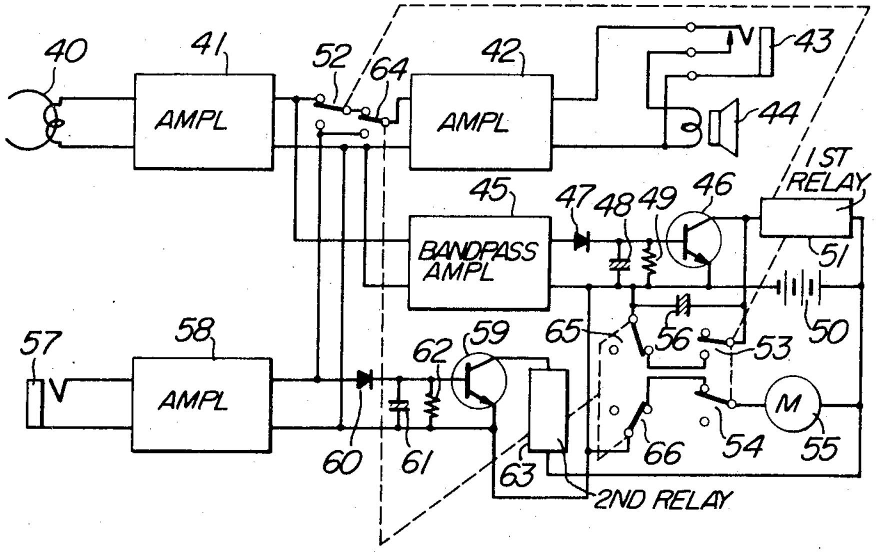
Figure 7:
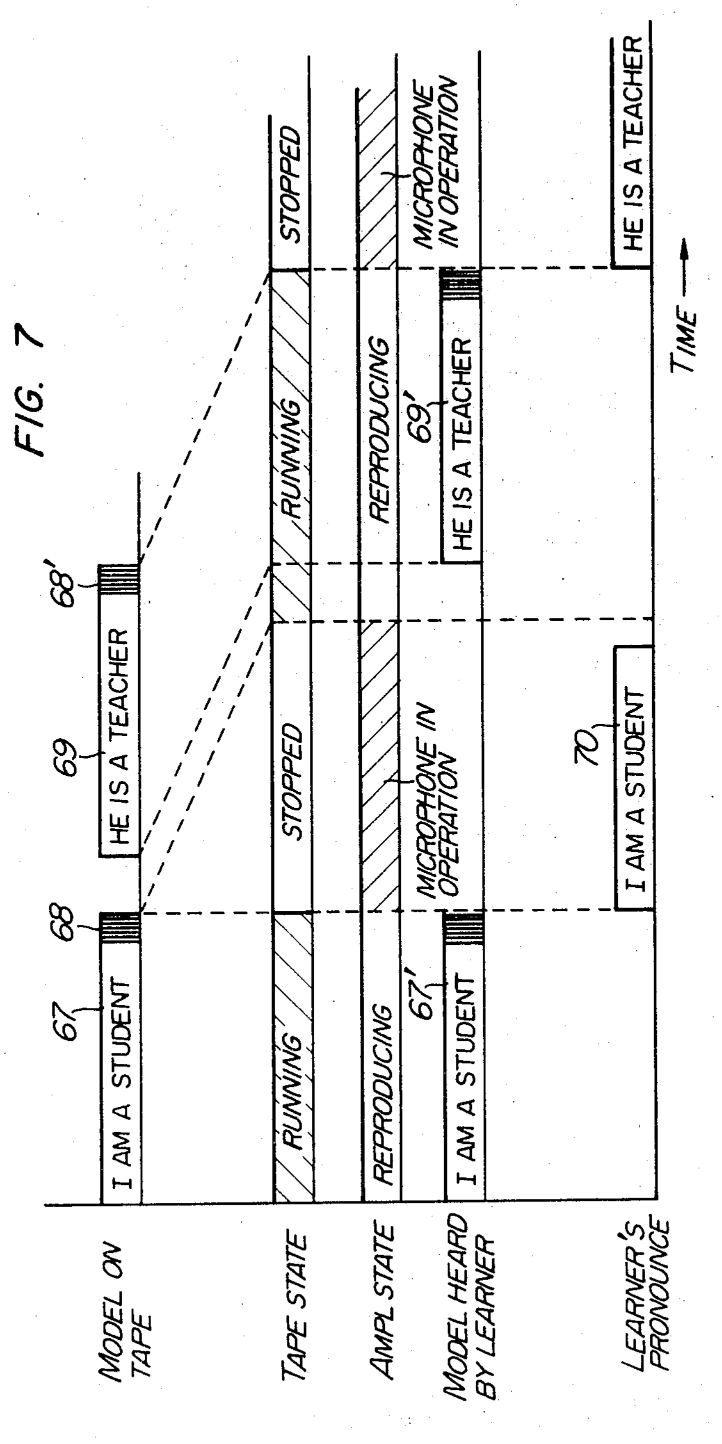
FIG. 7 is a diagram showing the manner in which the embodiments of FIGS. 5 and 6 are operated.

FIG. 7 illustrates the manner in which the embodiments shown in FIGS. 5 and 6 are put to actual use. At the end of a presentation of the teaching materials 67, the signal for temporary stoppage 68 is reproduced to stop the tape, whereupon the learner begins a pronunciation or speaking practice 70. After that, the tape driving motor is started by the learner depressing the switch 36 in the case of FIG. 5, or by the transistor 59 being cut off resulting in the second relay becoming inoperative in the case of FIG. 6, thereby to reproduce the lesson 69. These processes are subsequently repeated.

Figure 8:
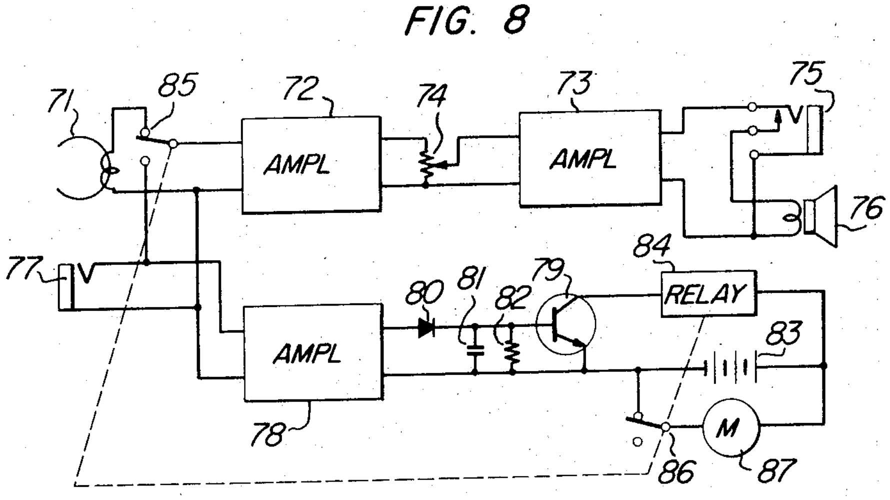
FIGS. 8 and 9 show electrical circuit diagrams of other embodiments.

An electric circuit diagram of still another embodiment of the invention is shown in FIG. 8, in which the numeral 71 shows a reproducing head, numeral 72 an amplifier which receives an output signal of the reproducing head 71 via a switch, numeral 73 an output amplifier which receives the output of the amplifier 72 through the volume control 74, numeral 75 an earphone jack connected with the output side of the output amplifier 73, and numeral 76 a speaker connected also with the output side of the amplifier 73. This speaker 76 and the earphone jack 75 are interrelated to each other in such a manner that usually the speaker 76 is energized, while it is de-energized when the earphone is connected with the earphone jack 75. Numeral 77 shows a microphone jack, numeral 78 an amplifier which receives a signal from the microphone jack 77, numeral 79 a transistor which receives the output of the amplifier 78 between its base and emitter through the diode 80, numerals 81 and 82 a capacitor and a resistor respectively which are inserted between the base and the emitter of the transistor 79. Numeral 83 shows a power supply, numeral 84 a relay inserted between the power supply 83 and the collector of transistor 79, the relay 84 being provided with the two switches 85 and 86. Numeral 87 shows a tape driving motor connected with the power supply 83 through the switch 86 of relay 84. The switch 85 of the relay 84 is so arranged as to select, as the input of the amplifier 72, either of a signal from the reproducing head 71 and a signal from the microphone jack 77.

Now let us explain the operation of this embodiment constructed as mentioned above. Usually, the relay 84 is not energized and the switches 85 and 86 are positioned as shown in the drawing. Under this condition, the motor 87 is started by operating the starting switch (not shown in the drawing) provided in the power circuit of the motor 87, and as a result the reproducing tape begins to run, transmitting signals representing the lesson from the reproducing head 71 to the earphone or speaker 76, which the learner can hear as the teacher's voice.

When the learner speaks or pronounces to the microphone after a lesson is ended, a signal representing such a speech or pronunciation is applied through the microphone jack to the amplifier 78, and the output of the amplifier elevates the electric potential of the capacitor 81, thereby to conduct the transistor 79. Then, the collector current of the transistor 79 increases and the relay 84 is energized, causing the switches 85 and 86 to be changed over. As the result of the changing-over of the switch 85, the input of the amplifier 72 is switched from the reproducing head 71 to the microphone, whereby the earphone or speaker 76 reproduces a voice which the learner spoke into the microphone. On the other hand, the changing-over of the switch 86 causes the power circuit of the motor 87 to be opened, thereby stopping the reproducing tape. During the stoppage of the reproducing tape, the learner conducts a speaking or pronouncing practice imitating or just considering the teacher's previously reproduced model. Then the learner's voice can be heard through the earphone or speaker 76. Upon completion of the learner's practice using the microphone, the input of transistor 79 disappears and the transistor 79 is cut off again, whereby the relay 84 is de-energized and hence the switches 85 and 86 are restored to the original positions shown in the drawing. As a result, the signal from the reproducing head 71 is applied through the amplifiers 72 and 73 to the earphone or spaker and at the same time the motor 87 is restarted, causing the reproducing tape to run. Thus the learner is allowed to proceed to the hearing of the next lesson. These processes of operation are repeated.

Figure 9:
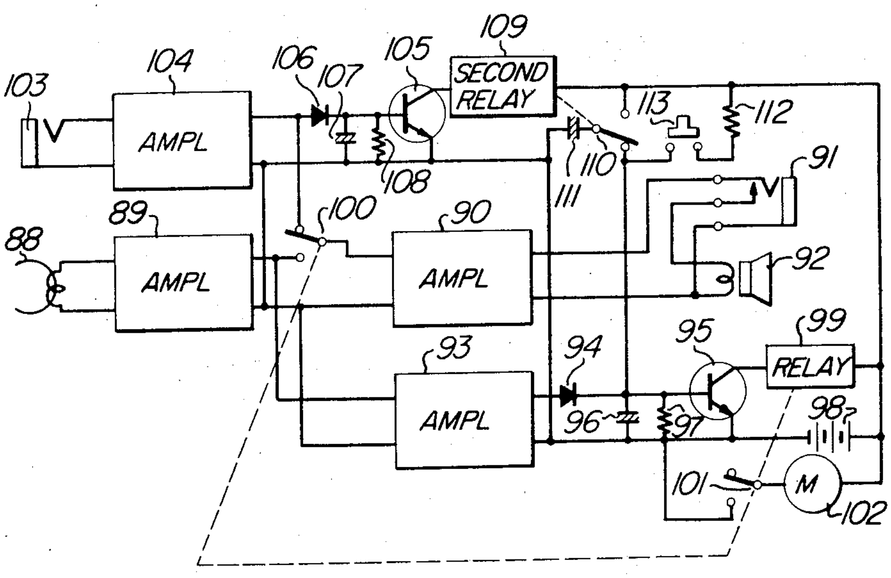

An electrical circuit diagram of still another embodiment of the invention is shown in FIG. 9, in which numeral 88 shows a reproducing head, numeral 89 an amplifier for amplifying a signal from the reproducing head 88, numeral 90 an output amplifier which receives through a switch an output signal of the amplifier 89, numeral 91 an earphone jack connected with the output side of the output amplifier 90, and numeral 92 a speaker connected also with the output side of the output amplifier 90. This speaker 92 is disconnected from the output amplifier 90 when an earphone is connected to the earphone jack 91. Numeral 93 shows an amplifier which receives the output signal from the amplifier 89, and the output side of the amplifier 93 is connected to the base and the emitter of the transistor 95 through the diode 94. Numeral 96 and 97 show respectively a capacitor and a resistor inserted between the base and emitter of the transistor 95. Numeral 98 shows a power supply, numeral 99 the first relay inserted between the power supply 98 and the collector of transistor 95, numerals 100 and 101 switches of the relay 99, numeral 102 a tape driving motor connected with the power supply 98 through the switch 101 of relay 99, numeral 103 a microphone jack, and numeral 104 an amplifier for amplifying a microphone signal from the microphone jack 103. Either the signal from the amplifier 104 or that from the amplifier 89 is selectively applied to the output amplifier 90 by the switch 100 of the first relay 99. Numeral 105 shows a transistor whose base and emitter are connected to the output side of the amplifier 104 through the diode 106, numerals 107 and 108 respectively a capacitor and a resistor inserted between the base and emitter of transistor 105, numeral 109 the second relay inserted between the power supply 98 and the collector of transistor 105, and numeral 110 a switch of the relay 109. The switch 110 is for transferring to the capacitor 96 electric charges, if any, generated in the capacitor 111 by the power supply 98. Numerals 112 and 113 show respectively a resistor and a starting switch inserted in series between the power supply 98 and the base of transistor 95.

The operation of the above-mentioned embodiments will be described below. When the apparatus is not in operation, the switches 100, 101 and 110 of the first and second relays 99 and 109 are positioned as shown in the drawing, and the starting switch 113 is opened. Assume that the starting switch is depressed for a reproducing operation. The capacitor 111 is charged and the electric potential of the capacitor 96 rises, thereby to cause the transistor 95 to conduct. Then the collector current of this transistor is increased, energizing the relay 99 and as a result changing over the switches 100 and 101. The change-over action of switch 101 causes the motor 102 to be driven and the tape to run, and signals recorded on the tape are picked up by the reproducing head 88. The signals thus picked up are applied to the amplifier 89, where they are amplified and then applied to the transistor 95 through the amplifier 93. As a result, the transistor 95 is maintained conductive, continuing the tape feed. On the other hand, the change-over of the switch 100 results in the output signal of amplifier 89 being applied to the output amplifier 90, which enables the learner to hear the recorded lesson through the earphone or speaker 92. When the signal from the reproducing head disappears on completion of a lesson, the output signal of the amplifier 93 also disappears and the transistor 95 is cut off, making the relay 99 inoperative. As a result, the switches 100 and 101 are restored to the positions as shown in the drawing. Then, the motor 102 stops running and the tape feed is stopped. Also, since the amplifier 104 is connected to the output amplifier 90, the signal from the microphone reaches the learner's ears through the earphone or speaker 92. Therefore, the subsequent pronounciation or speaking practice by the learner imitating or considering the recorded teacher's model can be heard and reviewed by the learner himself objectively through the earphone or speaker 92. The voice signals from the microphone and the speaker elevate the electric potential of the capacitor 107, thereby causing the transistor 105 to conduct. Then the relay 109 is energized and the switch 110 is changed over, charging the capacitor 111. When the learner ends a pronounciation or speaking practice, the transistor 105 is cut off and therefore the relay 109 is de-energized, restoring the switch 110 to the original position. As a result, the electric charges in the capacitor 111 move to the capacitor 96, whose electric potential is applied to the transistor 95, thereby to cause it to conduct again. Then the relay 99 is triggered and the motor 102 and eventually the tape starts running. In this way, the next lesson is picked up by the reproducing head 88 to be heard from the earphone or speaker 92.

In the above description, the apparatus is so constructed that the current flowing to the motor is cut off to stop the motion of the reproducing medium. However, this may be replaced by a method in which a mechanical braking force is applied in addition to the cutting off of the current to the motor or transmission of motion is cut off at same point in a transmission gearing while keeping the motor in motion. Also, although mostly tape is turned to as a recording medium in the above description, the apparatus according to the present invention is applicable to the same effect as a record player using a disc. Further, despite the above description of a reproducing circuit only, the present invention covers an apparatus including both reproducing and recording circuits.

It will be understood from the above explanation that the apparatus of the above construction according to the present invention, by being operated as mentioned above, enables a learner to hear his own voice objectively in a language study following a teacher's model. The learner thus can easily find and correct his defects of pronunciation or speech, thereby contributing to a marked progress of his study. In addition, since it is enough to provide a pause or time interval shorter than the pronunciation or speech of the learner between the recorded lessons, a recording medium can be used very economically, further increasing the commercial value of the apparatus.

What is claimed is:

1. In a reproducing device including a converter element for converting information recorded in a recording medium into an electric signal, an amplifier for amplifying said electric signal, a hearing means for hearing said electric signal as a voice, a voice receiver and a driving means for driving said recording medium; said reproducing device comprising a stop motion for temporarily stopping said recording medium during a reproducing operation and a switching device interlocked with said stop motion for switching an input of said amplifier between said converter element and said voice receiver during a reproducing operation, said amplifier being used for amplifying both a signal from said converter element and a signal from said voice receiver, an output signal from said voice receiver being amplified and heard through said hearing means as a voice while said recording medium is stopped by said stop motion, a signal from said converter element being amplified by said amplifier and heard by said hearing means as a voice when said recording medium is released from the temporary stoppage.

2. A reproducing device according to claim 1, in which said stop motion includes a change-over switch inserted between said driving means and a power supply therefor, and said switching means includes said converter means and a change-over switch which is inserted between said voice receiver and said common amplifier and interlocked with said change-over switch inserted between said driving means and said power supply therefor.

3. A reproducing means according to claim 1, in which said stop motion includes both a relay connected with said power supply for the driving means through a push button and a change-over switch which is inserted between said driving means and said power supply and energized by said relay, and said switching means includes said converter element and a change-over switch which is inserted between said voice receiver and said common amplifier and energized by said relay.

4. A reproducing device according to claim 1, in which said reproducing device additionally includes a detector means which temporarily stops said recording medium by detecting a temporary stoppage signal recorded on said recording medium and automatically energizes said stop motion and switching means in such a manner as to connect said voice receiver and said common amplifier with each other, and also includes a releasing means which not only releases the temporary stoppage of said recording medium, but automatically connects said converter element and said common amplifier with each other.

5. A reproducing device according to claim 4, in which said detector means includes a band pass filter with a center frequency agreeing with the frequency of said temporary stoppage signal and a transistor whose base is connected with a diode which is in turn connected with the output side of said filter, a resistor and a capacitor connected in parallel with each other being inserted between the base and emitter of said transistor; said stop motion includes a relay which is inserted between the collector and emitter of said transistor through the power supply of said driving means and self-maintained by a change-over switch which is inserted between the emitter of said transistor and said relay and energized by said relay, and also includes a change-over switch provided between said driving means and said power supply and energized by said relay; said switching means includes said converter means and a change-over switch which is inserted between said voice receiver and said common amplifier and energized by said relay; and said releasing means consists of a switch inserted between said relay and said power supply.

6. A reproducing device according to claim 1, in which said reproducing device additionally includes a first detector means which temporarily stops said recording medium by detecting a temporary stoppage signal recorded on said recording medium and which automatically energizes said stop motion and said switching means in such a manner as to connect said voice receiver and said common amplifier with each other; a second detector means for detecting the output signal of said voice receiver; and a means which maintains the temporary stoppage of said recording medium and the connection between said voice receiver and said amplifier in response to the output signal of said second detector means and automatically releases the temporary stoppage of said recording medium when a signal from said voice receiver disappears, thereby making it possible to connect said converter element and said amplifier with each other.

7. A reproducing device according to claim 6, in which said first detector means includes a bandpass amplifier with a center frequency agreeing with the frequency of said temporary stoppage signal and a first transistor whose base is connected to a diode which is in turn connected to the output side of said bandpass amplifier, a resistor and a capacitor connected in parallel with each other being inserted between the base and emitter of said transistor; said stop motion includes a first relay which is inserted between the collector and emitter of said first transistor through the power supply of said driving means and self-maintained by a change-over switch which is inserted between said power supply and said first relay and energized by said first relay, and which also includes a change-over switch which is inserted between said driving means and said power supply and energized by said first relay; said switching means includes said converter element and a change-over switch which is inserted between said voice receiver and said common amplifier and energized by said first relay; said second detector means includes an amplifier for amplifying a signal from said voice receiver and a second transistor whose base is connected with a diode which is in turn connected with the output side of said voice-receiver-output amplifier, a resistor and a capacitor connected in parallel with each other being inserted between the base and emitter of said second transistor; and said means for responding to said second detector means includes a second relay inserted between the collector and emitter of said transistor through said power supply, a change-over switch which is inserted between said first relay and said power supply and energized by said second relay, a capacitor connected in parallel with a series circuit consisting of said first relay and said power supply and also in parallel with a series circuit consisting of said two change-over switches which are inserted between said first relay and said power supply and respectively energized by said first and second relays, a change-over switch which is inserted between said driving means and said power supply and energized by said second relay, and a change-over switch which is inserted between said change-over switch constituting said switching means and said common amplifier and energized by said second relay.

8. A reproducing device according to claim 1, in which said reproducing device additionally includes a detector means for detecting a signal from said voice receiver, said detector means automatically energizing said stop motion and said switching means in such a manner that, when a signal from said voice receiver is detected, said recording medium is temporarily stopped and said voice receiver is connected with said common amplifier, and when said signal from said voice receiver disappears, the temporary stoppage of said recording medium is released and said converter element is connected with said common amplifier.

9. A reproducing device according to claim 8, in which said detector means includes an amplifier for amplifying an output signal from said voice receiver and a transistor whose base is connected with a diode connected with the output side of said amplifier, a resistor and a capacitor connected in parallel with each other being inserted between the base and emitter of said transistor; said stop motion consists of a relay inserted between the collector and emitter of said transistor through the power supply of said driving means and a change-over switch which is inserted between said driving means and said power supply and energized by said relay; and said switching means consists of said converter element and a change-over switch which is inserted between said voice receiver and said common amplifier and energized by said relay.

10. A reproducing device according to claim 1, in which said reproducing device additionally includes a first detector means for detecting information recorded on said recording medium, said first detector means automatically energizing said stop motion and said switching means in such a manner that, when the information recorded on said recording medium is not detected, said recording medium is temporarily stopped and said voice receiver is connected with said common amplifier; a releasing means for temporarily releasing the temporary stoppage of said recording medium; and a second detector means for detecting an output signal from said voice receiver, which automatically energizes said releasing means in such a manner that, when a signal from said voice receiver is not detected, the temporary stoppage of said recording medium is released and said converter element is connected with said common amplifier.

11. A reproducing device according to claim 10, in which said first detector means includes a first amplifier for amplifying a signal from said converter element and a first transistor whose base is connected with a diode connected to the output side of said first amplifier, a resistor and a capacitor connected in parallel with each other being inserted between the base and emitter of said first transistor; said stop motion includes a first relay inserted between the collector and emitter of said first transistor through the power supply of said driving means, and a change-over switch which is inserted between said driving means and said power supply and energized by said first relay; said switching means consists of said converter element and a change-over switch which is inserted between said voice receiver and said common amplifier and energized by said first relay; said second detector means includes a second amplifier for amplifying a signal from said voice receiver and a second transistor whose base is connected with a diode connected to said second amplifier, a resistor and a capacitor connected in parallel with each other being inserted between the base and emitter of said second transistor; and said releasing means includes a second relay inserted between the collector and emitter of said second transistor through said power supply, a change-over switch which is inserted between said power supply and a charging capacitor and energized by said second relay, and said charging capacitor which is connected in parallel with said capacitor inserted between the base and emitter of said first transistor.

* * * * *